United States Patent [19]
Goodwin, III

[11] Patent Number: 6,164,535
[45] Date of Patent: Dec. 26, 2000

[54] PRICE MAINTENANCE SYSTEM AND METHOD

[75] Inventor: John C. Goodwin, III, Suwanee, Ga.

[73] Assignee: NCR Corporation, Dayton, Ohio

[21] Appl. No.: 08/326,992

[22] Filed: Oct. 21, 1994

[51] Int. Cl.⁷ .................................................. G06K 15/00
[52] U.S. Cl. .......................... 235/383; 235/385; 235/432; 235/472.01
[58] Field of Search .................................... 235/383, 385, 235/432, 472.01

[56] References Cited

U.S. PATENT DOCUMENTS

| | | | |
|---|---|---|---|
| 4,101,366 | 7/1978 | Teraoka et al. | 156/378 |
| 4,679,154 | 7/1987 | Blanford | 235/383 |
| 4,766,295 | 8/1988 | Davis et al. | 235/383 |
| 5,111,196 | 5/1992 | Hunt | 235/383 |
| 5,149,947 | 9/1992 | Collins | 235/383 |
| 5,160,920 | 11/1992 | Harris | 345/52 |
| 5,267,800 | 12/1993 | Petteruti et al. | 400/88 |
| 5,424,521 | 6/1995 | Wolfe | 235/383 |
| 5,448,046 | 9/1995 | Swartz | 235/432 |
| 5,448,226 | 9/1995 | Failing | 235/383 |
| 5,473,146 | 12/1995 | Goodwin | 235/383 |

Primary Examiner—Harold I. Pitts
Attorney, Agent, or Firm—Paul W. Martin

[57] ABSTRACT

A price maintenance system and method in which price information entered into or read from a price-lookup file is shared to avoid price mismatch. The price-lookup file and price changes to the price-lookup file are shared by a point-of-service system including a bar code scanner, and a routine for printing labels. The system includes a computer coupled to the point-of-service system which updates the prices within the price-lookup file and sends the updated prices to the label printing routine for printing by a printing system. An electronic shelf label system may also share the price-lookup file and price changes to the price-lookup file.

14 Claims, 2 Drawing Sheets

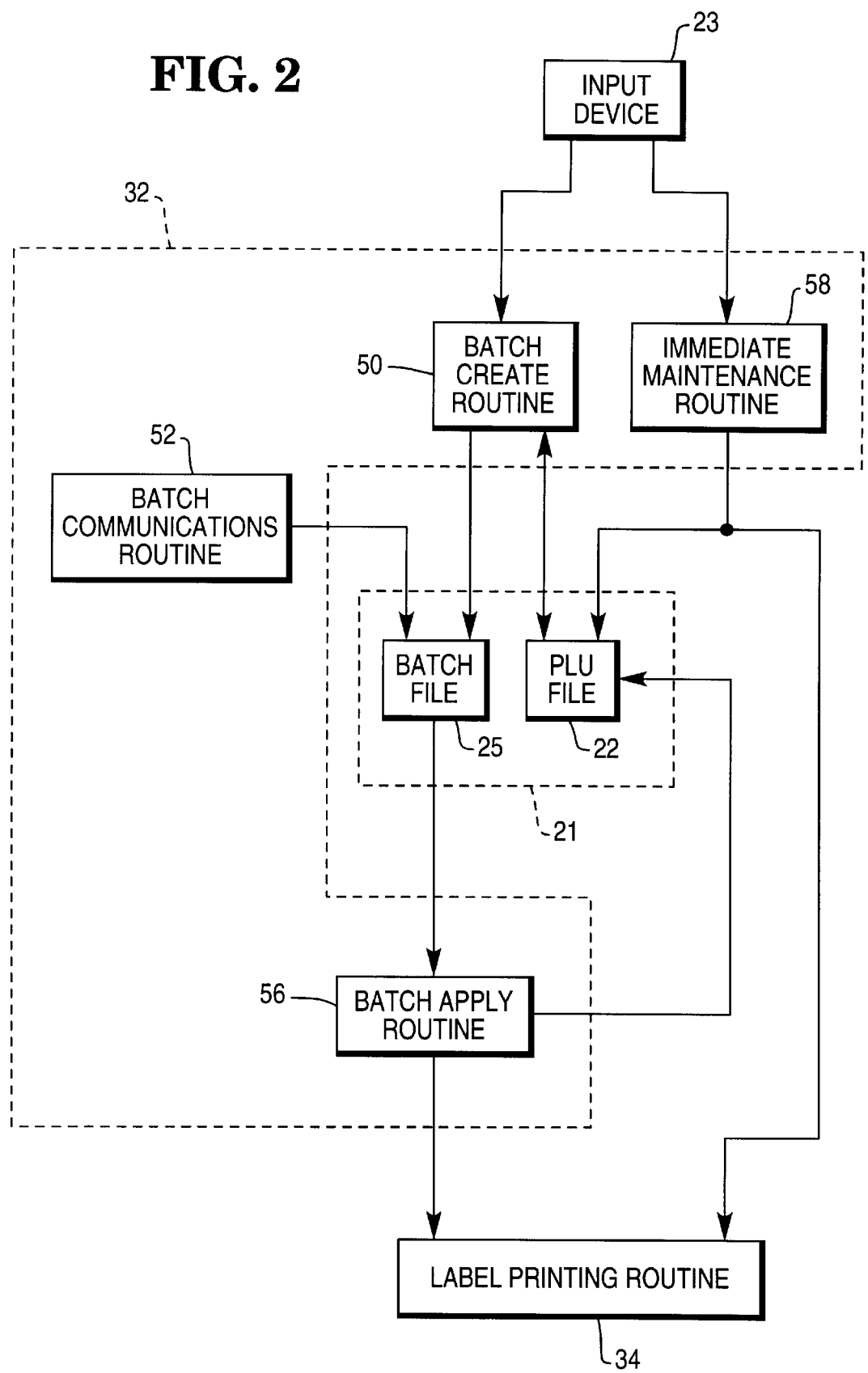

PRICE MAINTENANCE SYSTEM AND METHOD

BACKGROUND OF THE INVENTION

The present invention relates to shelf label systems, and more specifically to a price maintenance system and method.

Printed labels are a necessary way of informing customers of information about products on shelves. These labels may be the exclusive method of relaying information, or they may be used in combination with electronic shelf label systems.

Label printing is currently performed at a printing location outside of a store, or within a store. For example, U.S. Pat. No. 5,267,800, issued to Petteruti et al. and entitled "Miniature, Portable, Interactive Printer", discloses a system for printing shelf labels on site. The system includes the subject printer and a host computer system within the store and coupled to the subject printer.

In a traditional retail store, bar code scanners rely on price information maintained within a price-lookup (PLU) file. The PLU file is stored in a single location at host server. A PLU maintenance routine updates the PLU file when prices are changed. The PLU maintenance routine may immediately update prices one by one, or several price changes may be accumulated in a batch and updated together.

Known printing applications that print labels within the store obtain price information from price information files. These price information files are not the PLU files used by bar code scanners and terminals within the store. The PLU maintenance routine and the label printing applications do not interact or exchange a single set of data. Thus, a condition called "price mismatch" may occur. Price mismatch is defined as a difference between a price printed on a label and a price within the PLU file used by the bar code scanner and terminal.

Therefore, it would be desirable to provide a system and method for printing labels which use only the PLU file so that price mismatch is minimized. It would also be desirable to provide such a system and method in which the label printing can be halted when the PLU file is unavailable to provide price changes.

SUMMARY OF THE INVENTION

In accordance with the teachings of the present invention, a price maintenance system and method are provided. The price maintenance system includes a computer system coupled to a point-of-service system which updates prices within a price-lookup file, and sends the updated prices to the label printing routine for printing by a printing system. The computer system includes an input device and a storage medium. Price changes to the price-lookup file may be sent to the label printing routine as they are recorded by the input device, or they may be stored within the storage medium and sent in batch to the label printing routine.

Under the method of the present invention, price information entered into or read from a price-lookup file is shared to avoid price mismatch. The price-lookup file and price changes to the price-lookup file are shared by a point-of-service system including a bar code scanner, and a routine for printing labels. An electronic shelf label system may also share the price-lookup file and price changes to the price-lookup file.

It is accordingly an object of the present invention to provide a price maintenance system and method.

It is another object of the present invention to provide a price maintenance system and method in which a price-lookup file is shared by a bar code scanner and a label printing routine.

It is another object of the present invention to provide a price maintenance system and method for sending updated price information to a label printing routine as the updated price information is recorded by a computer input device.

It is another object of the present invention to provide a price maintenance system and method for storing updated price information in a storage medium and later sending the updated price information to a label printing routine in batch.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2 is a block diagram of a PLU maintenance routine executed by a computer within the system of the present invention.

DETAILED DESCRIPTION OF THE PREFERRED EMBODIMENT

Figure 1:
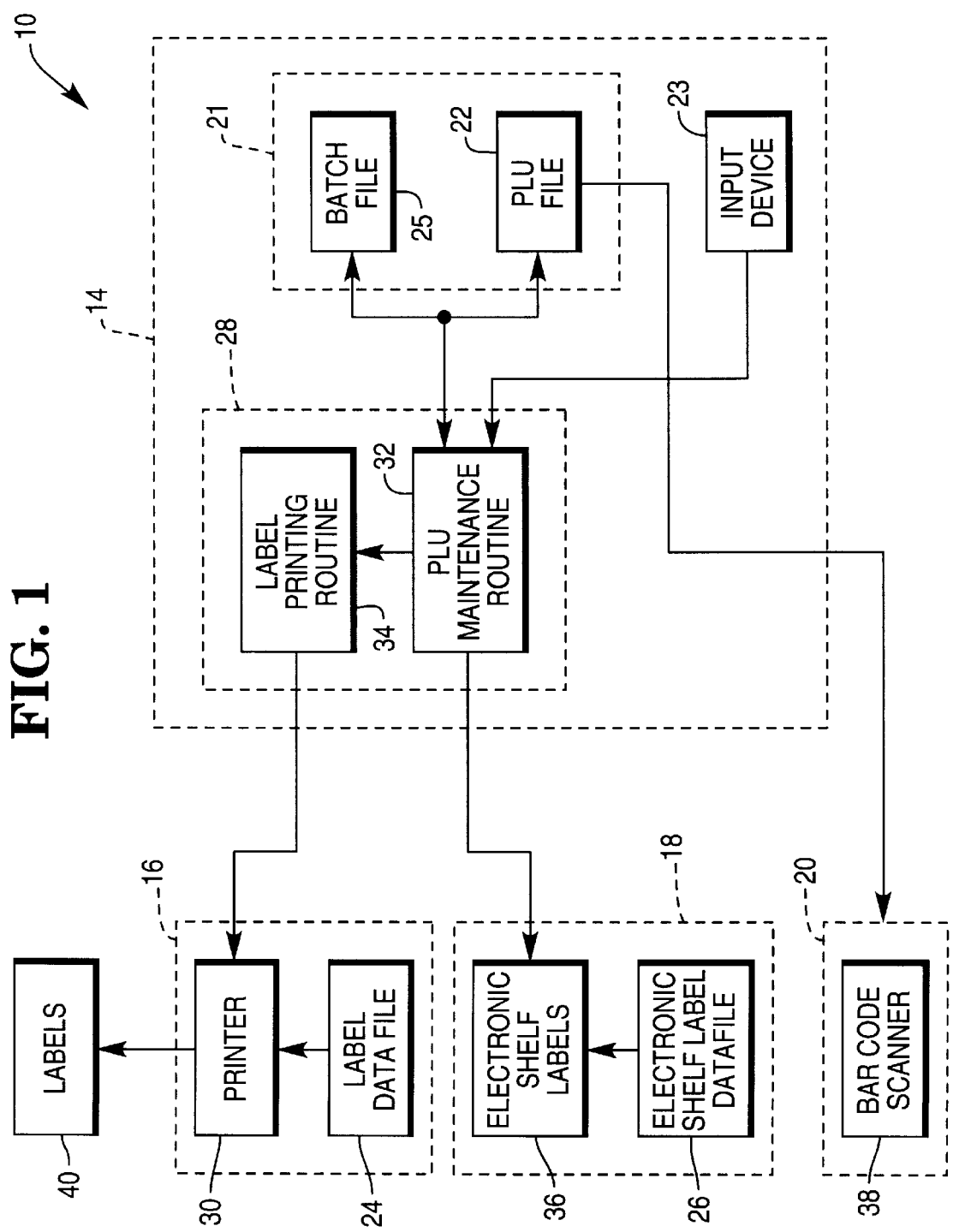
FIG. 1 is a block diagram of the system of the present invention.

Referring now to FIG. 1, system 10 primarily includes host computer system 14, label printing system 16, and point-of-service (POS) terminal system 20. System 10 may also include electronic shelf label (ESL) system 18. Here, components 14, 16, and 20 are shown as separate components, but all or some predetermined combination of components 14, 16, and 20 may also form a single component. Thus, host computer system 14 may be a POS terminal with integral printing capability.

POS terminal system 20 includes bar code scanner 38.

Label printing system 16 prints labels 40 and includes printer 30 and label data file 24. Labels 40 are preferably made of a paper medium. Label data file provides information other than price information which is printed on labels 40. If label data file 24 were to contain price information, price mismatch could occur.

ESL system 18 primarily includes ESL data file 26 and electronic shelf labels (ESLs) 36. ESL data file contains identification, but not price information. If ESL data file 26 were to contain price information, price mismatch could occur.

Host computer system 14 includes storage medium 21 for storing price-lookup (PLU) file 22, and input device 23 for recording price changes to PLU file 22. PLU file 22 is available for distribution to terminal 20. Alternatively, provision may be made for direct access to PLU file 22 by bar code scanner 38. Host computer system 14 executes a price-lookup (PLU) maintenance application 28, which includes PLU maintenance routine 32 and label printing routine 34. PLU maintenance routine 32 updates PLU file 22.

It is a feature of the present invention that PLU maintenance routine 32 interacts with label printing routine 34 to exchange PLU price changes. PLU maintenance routine 34 may send the price changes to label printing routine 34 as they are entered in a keyboard or other input device 23 (immediate processing) or store price changes within a batch file 25 in storage medium 21 for later accessing by label printing routine 34 (batch processing). In either case, label printing routine 34 obtains price changes from PLU maintenance routine 32, not from a different source. Thus, price mismatch is avoided.

Turning now to FIG. 2, PLU maintenance routine 32 provides batch processing and immediate processing of price change requests, or some combination of both, depending upon label printing routine 34. The characteristics of label printing routine 34 depend upon the associated printer 30.

For batch processing, PLU maintenance routine 32 includes batch create routine 50, batch communication routine 52, and batch apply routine 56.

For immediate processing, PLU maintenance routine 32 includes immediate maintenance routine 58.

Batch create routine 50 reads PLU file 22 and creates batch file 25 of label printing jobs.

Batch communication routine 52 applies a communication protocol to batch file 25.

Batch apply routine 56 implements each of the price change requests within batch file 25 to update PLU file 22 and generates commands to label printing routine 34 to print updated labels 40.

Immediate maintenance routine 58 accepts user price change input, directly applies such input to update PLU file 22, and generates commands to label printing routine 34 to print updated labels 40.

Under the method of the present invention, batch processing is best suited for printers 30 that use as much of the paper stock as possible, such as laser printers. Under batch processing, all of the price changes to PLU file 22 are made and stored within batch file 25. The batch is then passed to label printing routine 34.

Immediate processing is best suited for printers that use rolled stock and print a single item at a time, such as thermal printers. Under immediate processing, PLU file 22 is updated one change at a time, and price changes are passed to label printing routine 34 one at a time.

When system 10 includes ESL system 18, the same price change information under either method is preferably applied to generate commands which update ESLs 36.

Advantageously, use of the same information for updating PLU file 22, generating commands to initiate label printing, and generating commands for updating ESL prices when so equipped reduces the possibility that the host system is to blame for price mismatch.

Although the present invention has been described with particular reference to certain preferred embodiments thereof, variations and modifications of the present invention can be effected within the spirit and scope of the following claims.

What is claimed is:

1. A price maintenance system comprising:
a point-of-service system including a bar code scanner, and a price-lookup file used by the bar code scanner to determine prices of scanned items; and
a computer coupled to the point-of-service system which updates the prices within the price-lookup file and sends the updated prices to a label printing routine to avoid price mismatch between the price-lookup file and a printed label on an item whose price has changed.

2. The system as recited in claim 1, wherein the computer individually sends the updated prices to the label printing routine as they are updated.

3. The system as recited in claim 1, wherein the computer stores the updated prices and then sends the updated prices to the label printing routine as a batch.

4. The system as recited in claim 1, further comprising:
an electronic shelf label system coupled to the computer which uses the price-lookup file to display prices.

5. The system as recited in claim 1, further comprising:
another computer, coupled to the one computer, which executes the label printing routine.

6. A price maintenance system comprising:
an electronic shelf label system;
a point-of-service system including a bar code scanner, and a price-lookup file used by the bar code scanner to determine prices of scanned items and used by the electronic shelf label system to display prices; and
a computer coupled to the point-of-service system and the electronic shelf label system which updates the prices within the price-lookup file and individually sends the updated prices to a label printing routine as they are updated to avoid price mismatch between the price-lookup file and a printed label on an item whose price has changed.

7. A price maintenance system comprising:
an electronic shelf label system;
a point-of-service system including a bar code scanner, and a price-lookup file used by the bar code scanner to determine prices of scanned items and used by the electronic shelf label system to display prices; and
a computer coupled to the point-of-service system and the electronic shelf label system which updates the prices within the price-lookup file, stores the updated prices, and sends the updated prices to a label printing routine as a batch to avoid price mismatch between the price-lookup file and a printed label on an item whose price has changed.

8. A method of avoiding price mismatch between a first set of price data within a price-lookup file and a second set of price data displayed by printed labels comprising the steps of:
updating the first set of price data within the price-lookup file; and
sending the updated first set of price data as the second set of price data to a routine which prints the labels to avoid price mismatch between the price-lookup file and a printed label on an item whose price has changed.

9. The method as recited in claim 8, wherein the step of sending comprises the substep of:
sending the updated prices to the routine one by one as they are updated.

10. The method as recited in claim 8, wherein the step of sending comprises the substeps of:
storing the updated prices; and
sending the updated prices to the routine as a batch.

11. A method of avoiding price mismatch between a first set of price data within a price-lookup file, a second set of price data displayed by printed labels, and a third set of price data displayed by an electronic price labels, the method comprising the steps of:
updating the first set of price data within the price-lookup file;
sending the updated first set of price data as the second set of price data to a routine which prints the labels; and
sending the updated first set of price data as the third set of price data to the electronic price labels.

12. A price maintenance system comprising:
a plurality of electronic price labels;
a storage medium which contains a file containing prices which are displayed by the electronic price labels and which are accessed by a terminal during item checkout; and
a computer coupled to the storage medium which sends the prices from the file to a label printing routine in batch.

13. A price maintenance system comprising:
a plurality of electronic price labels;

a computer;

a storage medium coupled to the computer which contains a file containing prices which are displayed by the electronic price labels and which are accessed by a terminal during item checkout; and an input device coupled to the computer which records price changes as the price changes are entered by an operator;

wherein the computer sends the price changes directly from the input device to a label printing routine as the price changes are entered.

14. The system as recited in claim 13, wherein the computer sends the price changes directly from the input device to the electronic price labels as the price changes are entered.

* * * * *